(12) United States Patent
Doyle, Jr. et al.

(10) Patent No.: US 9,718,548 B2
(45) Date of Patent: Aug. 1, 2017

(54) PAYLOAD MOUNT ADAPTER ASSEMBLY

(75) Inventors: Thomas M. Doyle, Jr., South Burlington, VT (US); Travis L. Johnston, Essex Junction, VT (US)

(73) Assignee: General Dynamics—OTS, Inc., St. Petersburg, FL (US)

( * ) Notice: Subject to any disclaimer, the term of this patent is extended or adjusted under 35 U.S.C. 154(b) by 1606 days.

(21) Appl. No.: 13/015,359

(22) Filed: Jan. 27, 2011

(65) Prior Publication Data
US 2012/0193481 A1    Aug. 2, 2012

(51) Int. Cl.
*B64D 7/04*    (2006.01)

(52) U.S. Cl.
CPC ........................ *B64D 7/04* (2013.01)

(58) Field of Classification Search
USPC ................ 244/137.4; 89/37.16, 37.19
See application file for complete search history.

(56) References Cited

U.S. PATENT DOCUMENTS

| | | | |
|---|---|---|---|
| 4,223,591 A * | 9/1980 | Croissant, Jr. ............... | 89/37.19 |
| 4,850,553 A * | 7/1989 | Takata et al. ............. | 244/137.4 |
| 4,893,545 A | 1/1990 | Sanderson et al. | |
| 4,966,063 A | 10/1990 | Sanderson et al. | |
| 4,974,499 A | 12/1990 | Sanderson et al. | |
| 5,024,138 A | 6/1991 | Sanderson et al. | |
| 5,767,436 A | 6/1998 | Sanderson et al. | |
| 5,932,829 A * | 8/1999 | Jakubowski, Jr. ............. | 89/1.54 |
| 5,996,463 A * | 12/1999 | Gyre et al. .................... | 89/37.16 |
| 6,250,195 B1 * | 6/2001 | Mendoza et al. ............. | 89/1.59 |
| 6,401,592 B1 | 6/2002 | Rostocil | |
| 6,688,209 B1 * | 2/2004 | McMahon et al. ............ | 89/1.59 |
| 6,758,441 B2 * | 7/2004 | Jakubowski et al. ....... | 244/137.4 |
| 6,889,592 B2 * | 5/2005 | Isker et al. ..................... | 89/1.53 |
| 6,892,985 B2 * | 5/2005 | Jakubowski, Jr. ......... | 244/137.4 |
| 7,503,525 B1 * | 3/2009 | Lam et al. .................. | 244/137.4 |
| 2006/0108478 A1 | 5/2006 | Bajuyo et al. | |
| 2008/0121767 A1 | 5/2008 | Wimberley | |

* cited by examiner

*Primary Examiner* — Brian M O'Hara
*Assistant Examiner* — Keith L Dixon
(74) *Attorney, Agent, or Firm* — LKGlobal | Lorenz & Kopf, LLP

(57) ABSTRACT

A payload mount adapter assembly for use with an aircraft is disclosed. The payload mount adapter assembly includes, but is not limited to an upper section that is configured for mounting to the aircraft and a lower section that is configured to receive a payload. The lower section is releasably engaged with the upper section such that the lower section is substantially unadjustable with respect to the upper section when the lower section is in a fixed state and the lower section is substantially adjustable with respect to the upper section when the lower section is in a released state.

20 Claims, 17 Drawing Sheets

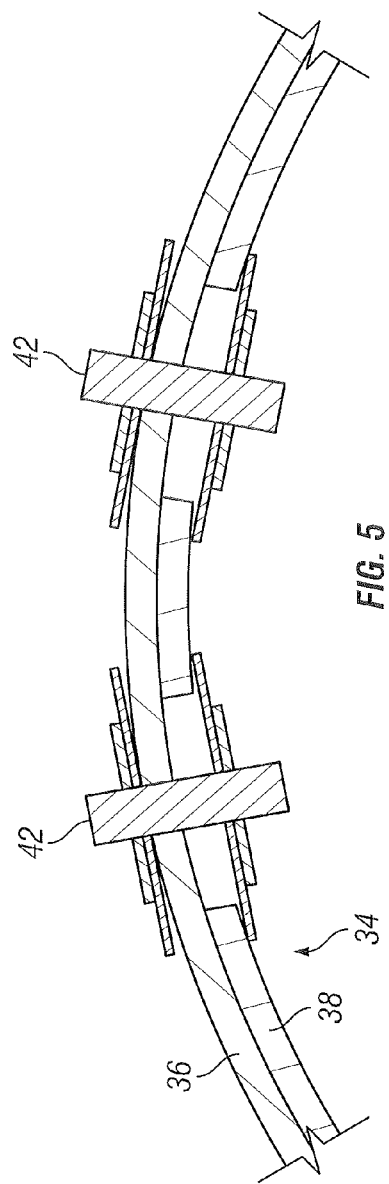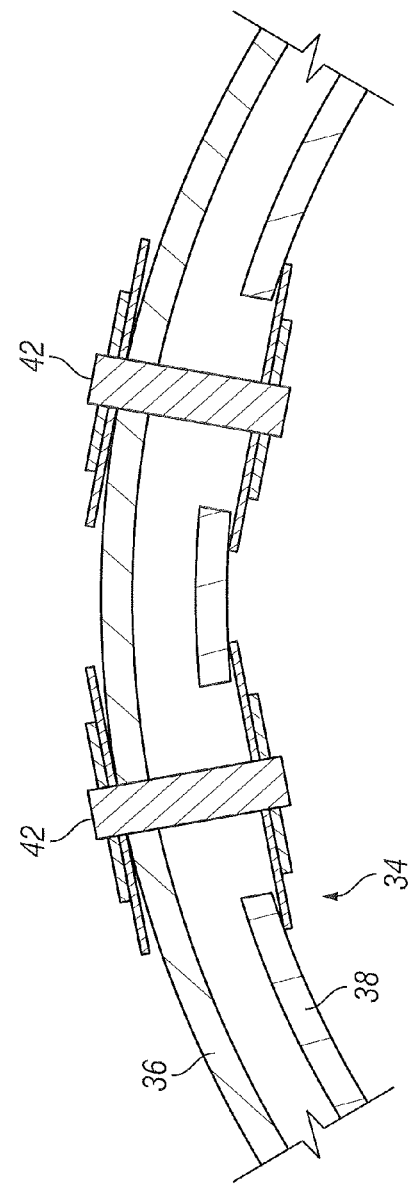

PAYLOAD MOUNT ADAPTER ASSEMBLY

TECHNICAL FIELD

The technical field generally relates to a payload mount adapter assembly and more particularly relates to a payload mount adapter assembly for mounting a payload to an aircraft.

BACKGROUND

Military aircraft commonly engage in a wide range of exercises, operations, and sorties that civil and/or commercial aircraft generally do not. Such missions may include combat training, actual combat, reconnaissance, surveillance, and many other types of missions that relate to national security. Such aircraft are often required to externally carry a payload when engaging in such missions. Such payloads can include a wide variety of equipment including, but not limited to, weapons, external fuel tanks, surveillance equipment, and many other types of equipment useful for carrying out a pilot's mission objective(s).

To facilitate the mounting of a payload to an external portion of the aircraft, the aircraft may be fitted with a mounting apparatus, referred to herein as a payload mount. The payload mount may be attached to a wing, a pylon, or to another structure on the aircraft. In some instances, the payload may be mounted directly to the wing, pylon or other structure of the aircraft without an intervening payload mount. Because different payloads will have different shapes, contours, and configurations, an adapter, referred to herein as a payload mount adapter assembly, is needed to facilitate the mounting of the payload to the payload mount or directly to the aircraft structure in instances where no payload mount is needed. The payload mount adapter assembly is configured to receive many different types of payloads and is also configured to be attached to the payload mount on the aircraft.

A conventional payload mount includes a central body and multiple laterally extending sway braces. The central body includes fasteners that are configured to engage with adjustable lugs that protrude from an upper surface of the payload mount adapter assembly. The payload mount adapter assembly and the payload hang down from the fasteners with the fasteners bearing the weight of both the payload mount adapter assembly and the payload. The sway braces are configured to inhibit the payload mount adapter assembly and the payload from moving laterally (swaying) during aircraft maneuvers. The sway braces conventionally include adjustable feet that extend downwardly from each sway brace to meet an upper surface of the payload mount adapter assembly. The adjustable feet are each independently adjustable in a direction towards and away from an upper surface of the payload mount adapter assembly. This adjustability allows the sway braces to accommodate payload mount adapter assemblies that are positioned at differing distances from the central body of the payload mount.

Some of the payloads that are mounted to military aircraft need to be aimed or bore-sighted in order to be used effectively. Because the payload is not adjustable with respect to the payload mount adapter assembly, the azimuth and the elevation of the payload mount adapter assembly with respect to the payload mount has historically been adjusted when bore-sighting of the payload is required. This process of bore-sighting the payload has historically required the involvement of multiple personnel to implement a multi-step, iterative, and time consuming process by which the adjustable lugs on the payload mount adapter assembly are adjusted. Such adjustment of the adjustable lugs will change the azimuth and elevation of the payload mount adapter assembly with respect to the central body of the payload mount. This change results in a change of the azimuth and the elevation of the payload. Because the adjustable feet on the sway braces of conventional payload mounts can be adjusted inwardly and outwardly, the adjusted position of the payload mount adapter assembly with respect to the central body of the payload mount can be accommodated.

New payload mounts have begun entering the market. Such new payload mounts have sway braces that lack adjustable feet. Rather, the feet on the sway braces of the new payload mounts are fixed and unadjustable. As the fasteners on the new payload mounts are tightened, the fasteners pull upwardly on the payload mount adapter assembly until an upper surface of the payload mount adapter assembly comes to rest against each fixed foot of each sway brace. In light of this new configuration, the adjustable lugs on conventional payload mount adapter assemblies can no longer be used to adjust the azimuth and elevation of the payload because any change in the relative positions of the payload mount adapter assembly and the central body of payload mount which results from adjustment of the adjustable lugs will be offset when the fasteners pull the payload mount adapter assembly against the feet of the sway braces.

Accordingly, it is desirable to provide a payload mount adapter assembly that is compatible for use with the new payload mounts and which permits the azimuth and elevation of the payload to be adjusted. In addition, in light of traditional limitations on the weight of objects that may be carried by aircraft, it is desirable to provide a payload mount adapter that is relatively light weight. It is further desirable to provide a payload mount adapter assembly that allows ground crew easy access to the payload without having to remove the payload from the payload mount adapter. Furthermore, other desirable features and characteristics will become apparent from the subsequent detailed description and the appended claims, taken in conjunction with the accompanying drawings and the foregoing technical field and background.

BRIEF SUMMARY

In an embodiment, a payload mount adapter assembly for use with a payload mount that is mounted to an aircraft includes, but is not limited to, an upper section that is configured for mounting to the payload mount and a lower section that is configured to receive a payload. The lower section is releasably engaged with the upper section such that the lower section is substantially unadjustable with respect to the upper section when the lower section is in a fixed state and the lower section is substantially adjustable with respect to the upper section when the lower section is in a released state.

In another embodiment, the payload mount adapter assembly includes, but is not limited to, an upper section that is configured for mounting to the payload mount. The upper section includes, but is not limited to a first engaging surface. The payload mount adapter further includes a lower section that is configured to receive a payload. The lower section includes, but is not limited to, a second engaging surface. The lower section is releasably fixed to the upper section such that when the lower section is in a fixed state, the second engaging surface engages the first engaging surface to substantially inhibit adjustment of the lower section with respect to the upper section. When the lower section is in a released state, the second engaging surface at least partially disengages from the first engaging surface to permit adjustment of the lower section with respect to the upper section.

In another embodiment, the payload mount adapter assembly includes, but is not limited to, an upper section that is configured for mounting to the payload mount. The upper section includes, but is not limited to a first spherical surface. The payload mount adapter assembly further includes a lower section that is configured to receive a payload. The lower section includes, but is not limited to a second spherical surface. The second spherical surface engages the first spherical surface. The lower section is releasably fixed to the upper section such that when the lower section is in a fixed state, the second spherical surface is pressed against the first spherical surface by a compressive force that substantially inhibits adjustment of the lower section with respect to the upper section. When the lower section is in a released state, the compressive force is reduced to permit the second spherical surface to slide with respect to the first spherical surface and thereby permit adjustment of the lower section with respect to the upper section.

BRIEF DESCRIPTION OF THE DRAWINGS

The present invention will hereinafter be described in conjunction with the following drawing figures, wherein like numerals denote like elements.

FIG. 5 is a fragmented, cross-sectional view illustrating an upper section and a lower section of the payload mount adapter assembly of FIG. 3 while the lower section is in a fixed state;

FIG. 6 is a fragmented, cross-sectional view similar to FIG. 5 illustrating the lower section in a released state;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A payload mount adapter assembly is disclosed herein that is both compatible with the new payload mount and that facilitates bore sighting of the payload. The payload mount adapter assembly includes an upper section which is configured to be mounted to the payload mount in a substantially unadjustable position. The payload mount adapter assembly further includes a lower section which is configured to receive the payload. The lower section is releasably attached to the upper section. As used herein, the term "releasably attached means that the attachment of the lower section to the upper section can alternate between a fixed state and a released state. When the lower section is in the fixed state, the lower section is engaged with the upper section in a manner that inhibits movement of the lower section with respect to the upper section and thus is substantially unadjustable with respect to the upper section. Any method or mechanism effective to inhibit movement of the lower section with respect to the upper section may be employed. When the lower section is in the released state, the lower section is engaged with the upper section in a manner that permits relative movement between the lower section and the upper section, and thus the lower section is substantially adjustable with respect to the upper section. Such adjustment can include either or both the azimuth and the elevation of the lower section. Accordingly, an operator seeking to bore-sight a payload need only place the lower section in a released state, adjust the position of the lower section with respect to the upper section as desired, and then place the lower section back in the fixed state to maintain the relative positioning between the upper section and lower section.

The payload mount adapter assembly may have a relatively light weight if the component parts are made from light weight materials. In one embodiment, the components may be made of aluminum. In other embodiments, other materials having light weight and sufficient strength may also be utilized to fabricate the payload mount adapter assembly. In addition, cut-outs may be placed in the upper and lower sections that reduce the amount of material needed to fabricate the payload mount adapter assembly and which lighten the assembly as well as providing operators with greater access to the payload without needing to detach the payload from the payload mount adapter assembly.

A greater understanding of the embodiments of the payload mount adapter assembly may be obtained through a review of the illustrations accompanying this application together with a review of the detailed description that follows.

Figure 1:
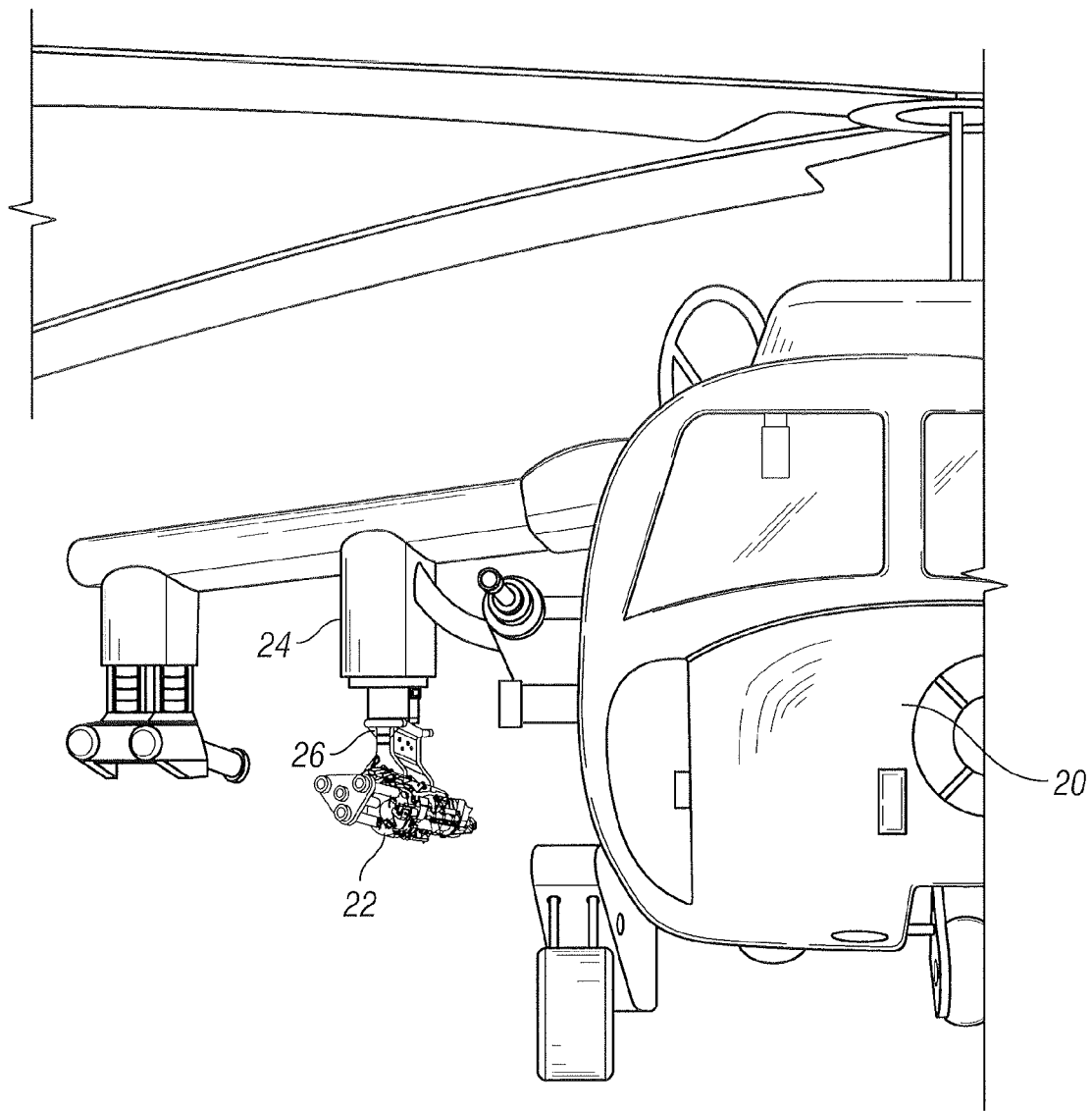
FIG. 1 is a fragmentary, perspective view illustrating an aircraft and a payload attached to the aircraft.

FIG. 1 is a fragmentary perspective view illustrating an aircraft 20 and a payload 22 attached to aircraft 20. Aircraft 20 includes a pylon 24 suitable for supporting payload 22. Attached at a lower portion of pylon 24 is a payload mount 26. Payload mount 26 is configured to receive payload 22, as discussed in more detail below. It should be understood that although aircraft 20 is depicted as a helicopter, the payload mount adapter assembly taught herein is not limited to use with helicopters. Rather, the payload mount adapter assembly taught herein is compatible with any type of aircraft. Furthermore, although the illustrated example depicts payload 22 as a rapid fire, automatic gun, it should be understood that the payload mount adapter assembly taught herein is compatible with any type of payload.

Figure 2:
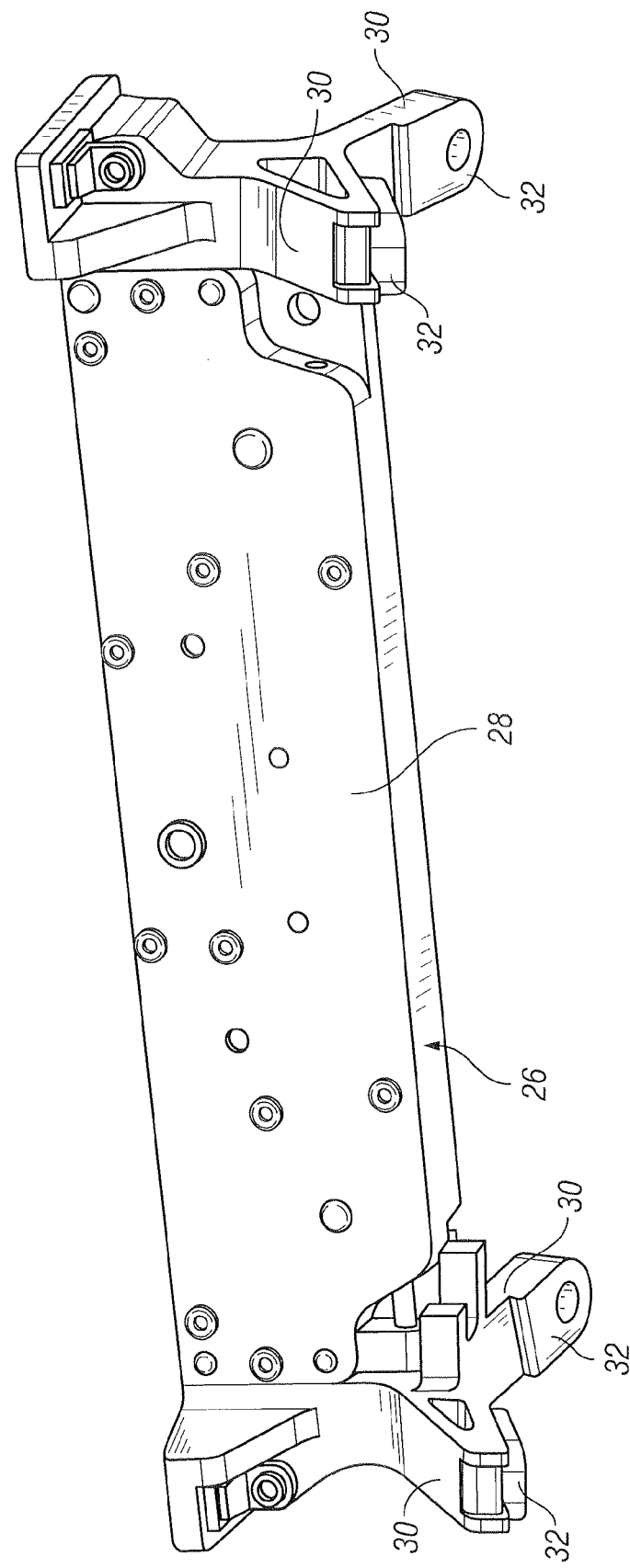
FIG. 2 is a perspective view illustrating a payload mount used by the aircraft to carry the payload.

FIG. 2 is a perspective view illustrating payload mount 26 used by aircraft 20 to carry payload 22. Payload mount 26 includes a central body 28 that is configured to attach to an aircraft and that includes fasteners (not shown) for receiving and carrying a payload mount adapter assembly and a payload. Payload mount 26 includes sway braces 30 which extend laterally from central body 28. A foot member 32 is disposed on an underside of each sway brace 30 and is configured to engage with an upper surface of the payload mount adapter assembly to inhibit the payload from swaying as the aircraft maneuvers. When mounting a payload to aircraft prior to flight, the payload is fitted with a payload mount adapter assembly that is configured to engage with payload mount 26. The payload and the payload mount adapter assembly are then positioned below payload mount 26 and the fasteners on central body 28 engage and pull the payload mount adapter assembly upwards towards central body 28 until an upper surface on the payload mount adapter assembly is firmly pressed against each foot member 32. At the conclusion of the flight, the fasteners are loosened and the payload and the payload mount adapter assembly are removed.

Figure 3:
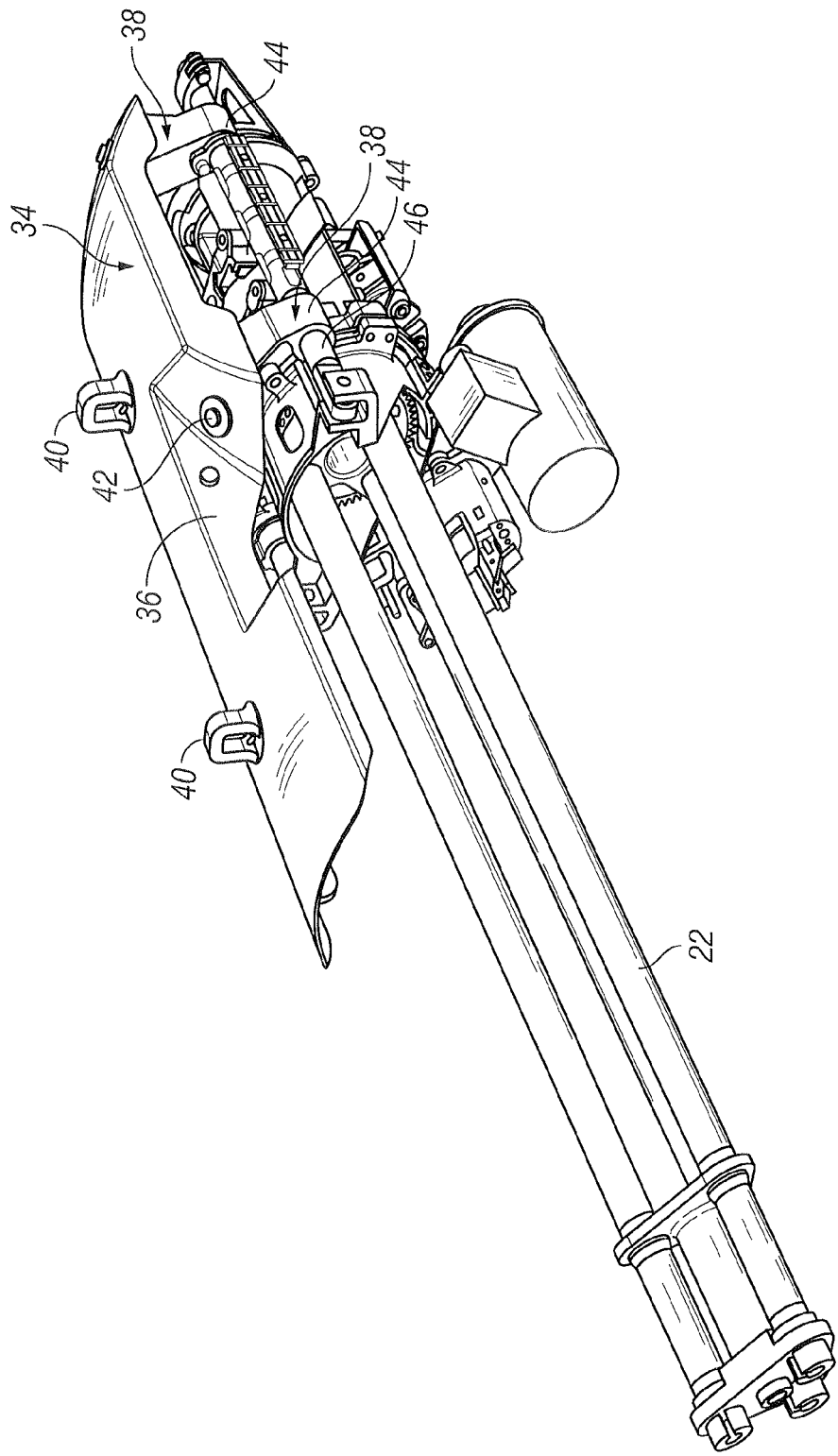
FIG. 3 is a perspective view illustrating a front quarter view of an embodiment of a payload mount adapter assembly and a payload.
Figure 4:
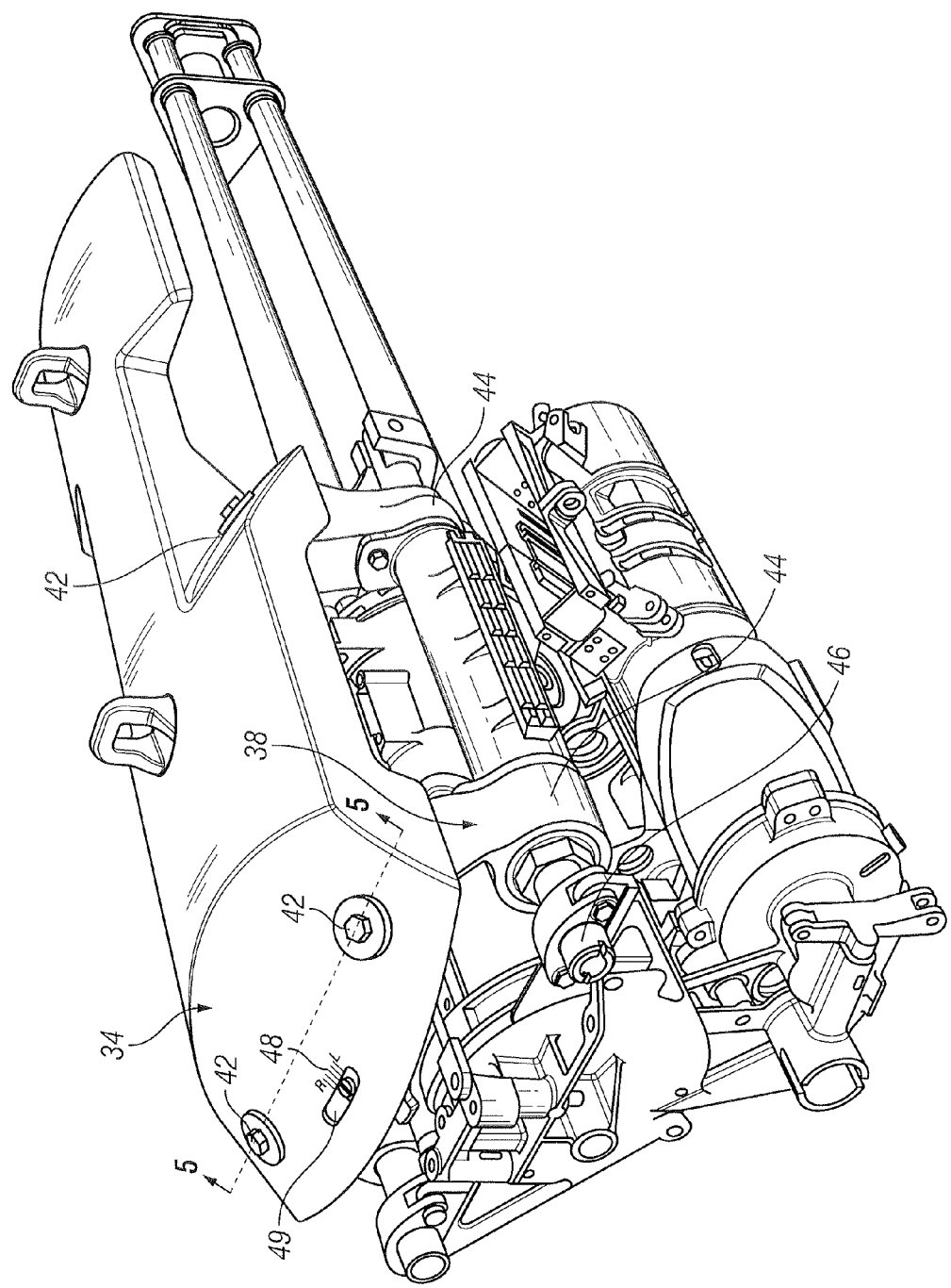
FIG. 4 is a perspective view illustrating a rear quarter view of the payload mount adapter assembly and the payload of FIG. 3.

FIG. 3 is a perspective view illustrating a front quarter view of an embodiment of a payload mount adapter assembly 34 and payload 22 and FIG. 4 is a perspective view illustrating a rear quarter view of payload mount adapter assembly 34 and payload 22. Payload mount adapter assembly 34 includes an upper section 36 and a lower section 38. Only a portion of lower section 38 is visible in FIGS. 3 and 4 due to engagement with upper section 36.

Protruding from an upper surface of upper section 36 are lugs 40. With continuing reference to FIGS. 1-4, lugs 40 are configured to engage the fasteners on payload mount 26. Although payload mount adapter assembly 34 is illustrated with only two lugs 40, in other embodiments, a greater or lesser number of lugs 40 may be included with payload mount adapter assembly 34. Additionally, although lugs 40 are depicted as metal loops, lugs 40 may have any suitable configuration. When lugs 40 are engaged with the fasteners on payload mount 26 and when the fasteners on payload mount 26 are tightened such that an upper surface of upper section 36 engages each foot member 32, then upper section 36 will be substantially immovable with respect to payload mount 26.

Lower section 38 includes legs 44 extending downwardly from each lateral side of lower section 38. Each pair of legs 44 on each lateral side of lower section 38 cooperates to support a spindle 46 extending between each leg of the pair. Payload 22 is configured to engage each spindle 46. When payload 22 is engaged with each spindle 46, payload 22 is attached to lower section 38. In other embodiments, any configuration effective to permit payload 22 and lower section 38 to attach to one another may be used.

Payload mount adapter assembly 34 includes four section fasteners 42 that releasably attach lower section 38 to upper section 36. In other embodiments, a greater or smaller number of section fasteners 42 may be utilized. Section fasteners 42 are configured to be tightened and loosened. Section fasteners 42 are configured to hold lower section 38 in a fixed state with respect to upper section 36 when tightened and are configured to hold lower section 38 in a released state with respect to upper section 36 when loosened. In the illustrated embodiment, section fasteners 42 are threaded fasteners. Thus, when section fasteners 42 are tightened, section fasteners 42 compress lower section 38 against upper section 36 in a manner that renders lower section 38 substantially immovable with respect to upper section 36. In some embodiments, engagement surfaces on upper section 36 and lower section 38 may be smooth and may frictionally engage to inhibit movement of lower section 38 with respect to upper section 36. In other embodiments, engagement surfaces on either or both upper section 36 and lower section 38 may have contours that interlock, engage, or that are otherwise configured to inhibit the engagement surfaces from moving with respect to one another while section fasteners 42 are tightened. When section fasteners 42 are loosened, the compression holding lower section 38 against upper section 36 is reduced allowing lower section 38 to slide with respect to upper section 36. Although section fasteners 42 are depicted here as threaded fasteners, in other embodiments, any type of fastener or mechanism that is effective to releasably attach lower section 38 to upper section 36 may be employed as section fasteners 42.

As best seen in FIG. 4, upper section 36 includes an azimuth gauge 48 that is configured to provide a visible indication of an adjustment of the elevation of lower section 38 with respect to upper section 36. The embodiment of payload mount adapter assembly 34 depicted herein provides up to 2° of elevation adjustment in either direction. In other embodiments, a larger or smaller range of azimuth and elevation adjustability may be provided. Also illustrated in FIG. 4 is an azimuth adjustment slot 49 defined through a rear portion of upper section 36 to allow adjustment of the azimuth of lower section 38, which is discussed in detail below. The azimuth adjustment slot 49 extends generally in the lateral direction of upper section 36.

FIG. 5 is a fragmented, cross sectional view taken along the line 5-5 of FIG. 4. With continuing reference to FIG. 1-5, FIG. 5 illustrates payload mount adapter assembly 34 while section fasteners 42 are tightened and lower section 38 is in the fixed state. Section fasteners 42 compress upper section 36 against lower section 38. In the illustrated embodiment, as a result of this compression, an upper surface of lower section 38 engages a lower surface of upper section 36 and the two surfaces are held in place with respect to one another by friction.

FIG. 6 is a fragmented, cross-sectional view similar to the view presented in FIG. 5. In FIG. 6, section fasteners 42 have been loosened and lower section 38 is in the released state. In some embodiments, section fasteners 42 may be loosened only to the point where the compression acting on upper section 36 and lower section 38 is alleviated sufficiently to permit lower section 38 to slide with respect to upper section 36. In FIG. 6, the distance depicted between upper section 36 and lower section 38 has been exaggerated for illustration purposes only. Once lower section 38 has been adjusted to a desired azimuth and elevation, section fasteners 42 may be tightened to restore the compression acting on upper section 36 and lower section 38 which, in turn places lower section 38 in the fixed state.

Figure 7:
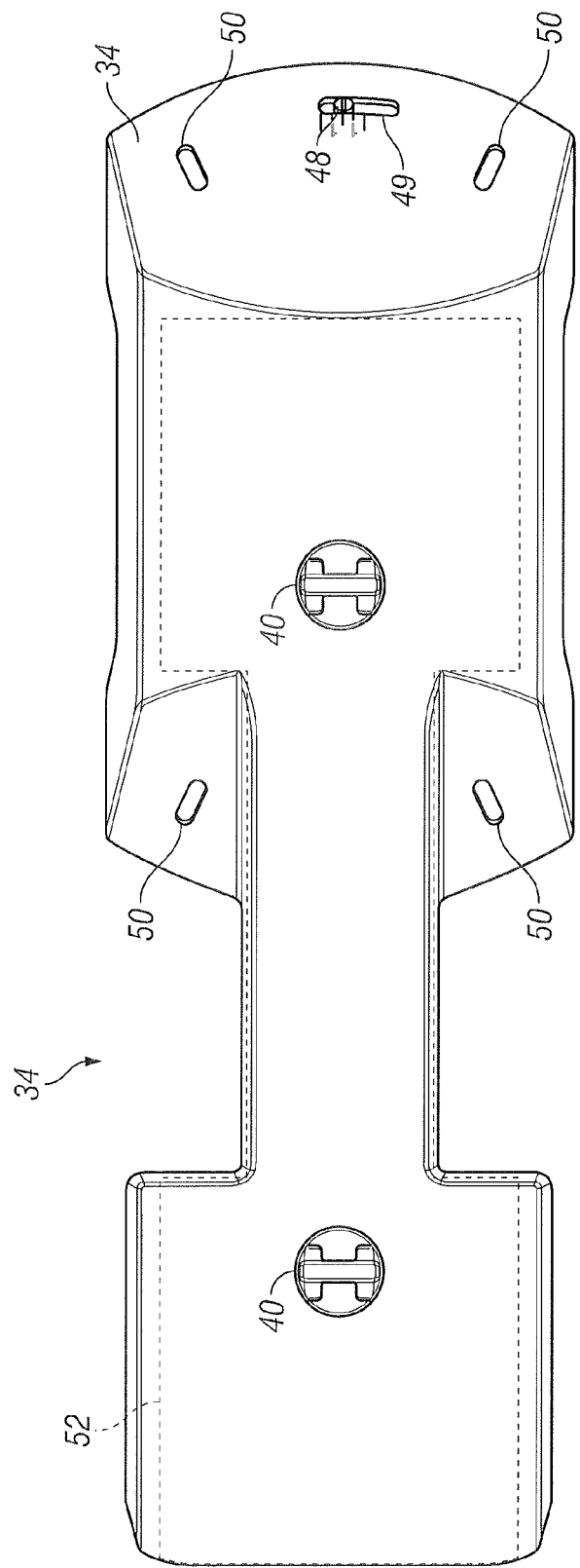
FIG. 7 is a view from above an upper section of the payload mount adapter assembly of FIG. 3.

FIG. 7 is a view from above upper section 36 of payload mount adapter assembly 34. With continuing reference to FIG. 1-7, in FIG. 7, section fasteners 42 have been removed to reveal elevation adjustment slots 50. Elevation adjustment slots 50 are slots that are defined in upper section 36 and which extend generally in a longitudinal direction of upper section 36. Section fasteners 42 extend through elevation adjustment slots 50 and also through azimuth adjustment slots extending through lower section 38, as discussed below. When section fasteners 42 are loosened and lower section 38 is in the released state, elevation adjustment slots 50 permit the elevation of lower section 38 to be adjusted with respect to upper section 36 by providing a pathway that accommodates movement of section fasteners 42 as the elevation of lower section 38 is raised and/or lowered. The length of elevation adjustment slots 50 will determine the extent to which the elevation of lower section 38 may be adjusted with respect to upper section 36.

Also illustrated in FIG. 7 is a support a plate 52. Support plate 52 provides added strength to upper section 36 at locations where upper section 36 will meet each foot member 32 of each sway brace 30. The added strength provided by support plate 52 further enables payload mount adapter assembly 34 to resist the side to side swaying motion that would otherwise be induced during maneuvering of aircraft 20. In the illustrated embodiment, support plate 52 is embedded within upper section 36 and is therefore illustrated in Phantom lines. Support plate 52 may be formed together with upper section 36 during an injection molding process. In other embodiments, support plate 52 may be a separate component that is positioned on top of an upper surface of upper section 36.

Figure 8:
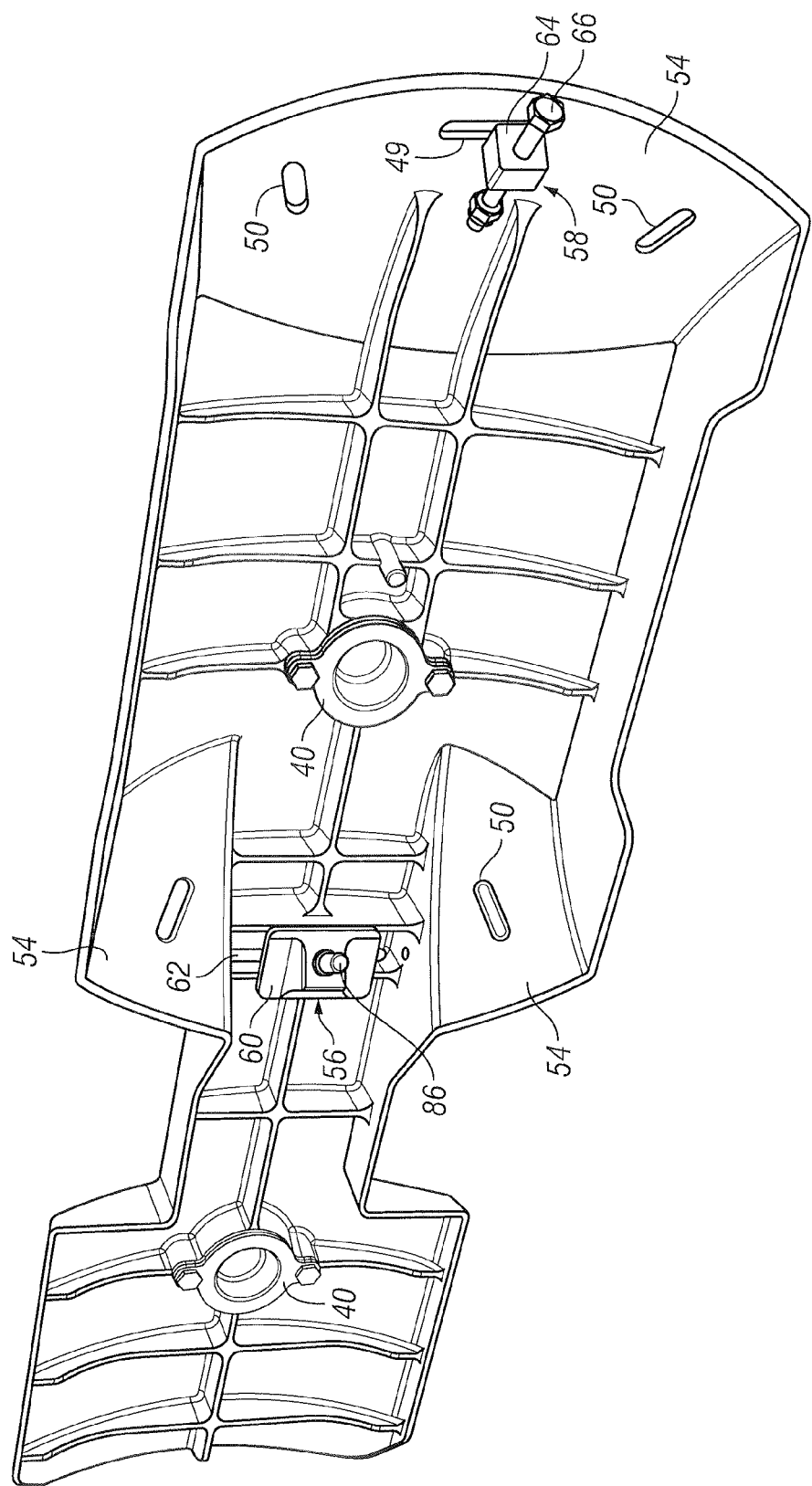
FIG. 8 is a perspective view from below the upper section of FIG. 7.

FIG. 8 is a view from below upper section 36. With continuing reference to FIG. 1-8, when viewing upper section 36 from below, a plurality of lower engagement surfaces 54 are visible. In the illustrated embodiment, lower engagement surfaces 54 are spherical surfaces that are configured to directly engage with corresponding surfaces on lower section 38, discussed below. Lower engagement surfaces 54 are arranged at locations on an underside of upper section 36 to receive and engage with lower section 38. In the embodiment illustrated herein, when lower section 38 is in the released state and the azimuth and elevation of lower section 38 are adjusted with respect to upper section 36, the engagement surfaces on lower section 38 are configured to slide with respect to lower engagement surfaces 54. Conversely, when lower section 38 is in the fixed state, lower engagement surfaces 54 will frictionally engage the corresponding engagement surfaces on lower section 38 to render lower section 38 substantially unadjustable with respect to upper section 36.

Also illustrated in FIG. 8 are embodiments of an azimuth adjustment subassembly 56 and an elevation adjustment subassembly 58. Azimuth adjustment subassembly 56 includes an engagement body 60 and a threaded shaft 62 that is in threaded engagement with engagement body 60. Engagement body 60 is configured to engage lower section 38 and threaded shaft 62 is configured to engage upper section 36. Azimuth adjustment subassembly 56 is oriented in a lateral direction of upper section 36. Engagement body 60 is configured to move laterally with respect to upper section 36 when threaded shaft 62 rotates. Engagement body 60 will move laterally in a direction that corresponds with the direction of rotation of threaded shaft 62. Engagement body 60 is configured to engage a front portion of lower section 38 such that movement of engagement body 60 toward a lateral side of upper section 36 will correspondingly cause movement of the front portion of lower section 38 towards that same lateral side when lower section 38 is in the released state. This movement has the effect of adjusting the azimuth of lower section 38, and thus the azimuth of payload 22, with respect to upper section 36.

Elevation adjustment subassembly 58 works in a similar manner. Elevation adjustment subassembly 58 includes an engagement body 64 and a threaded shaft 66 that are in threaded engagement and that are oriented in a direction suitable for adjusting the elevation of lower section 38 with respect to upper section 36. Engagement body 64 is configured to engage upper section 36 and threaded shaft 66 is configured to engage lower section 38. As a threaded shaft 66 is rotated, such rotation will cause relative movement between threaded shaft 66 and engagement body 64 in a direction along a longitudinal axis of threaded shaft 66. Engagement body 64 will be held in place through engagement with upper section 36. Accordingly, as threaded shaft 66 rotates and moves longitudinally with respect to engagement body 64, threaded shaft 66 will cause lower section 38 to move up or down depending upon the direction of rotation of threaded shaft 66. In this manner, when lower section 38 is in the released state, the elevation of lower section 38 can be adjusted with respect to upper section 36 and in turn, the elevation of payload 22 with respect to upper section 36 can also be adjusted.

Figure 9:
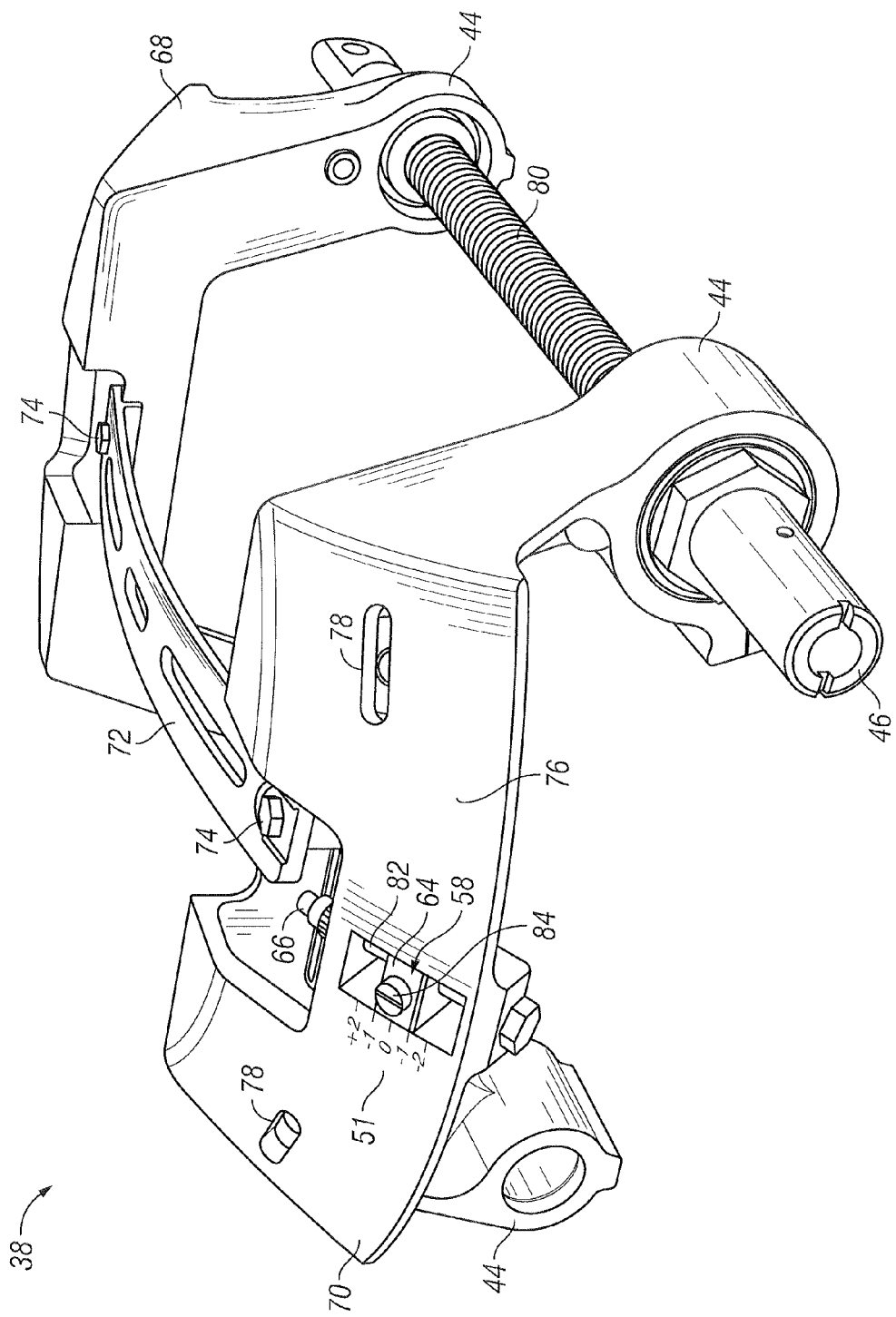
FIG. 9 is a perspective view illustrating a lower section of the payload mount adapter assembly of FIG. 3.

FIG. 9 is a perspective view illustrating lower section 38 of the payload mount adapter assembly. With continuing reference to FIG. 1-9, in the illustrated embodiment, lower section 38 includes a front member 68 and a rear member 70. Front member 68 and rear member 70 are joined to one another by a brace 72 that is secured to both front member 68 and rear member 70 via threaded fasteners 74. Brace 72 may also serve to inhibit front member 68 and rear member 70 from rotating about a longitudinal axis of payload 22. In other embodiments of payload mount adapter assembly 34, front member 68 and rear member 70 may not comprise two distinct components that are joined together, but rather, front member 68 and rear member 70 may comprise a single contiguous structure.

Legs 44 extend downwardly from front member 68 and from rear member 70. A single spindle 46 extends between leg 44 of the front member 68 and leg 44 of rear member 70. The illustrated spindle 46 is fitted with a recoil absorbing subassembly that includes a recoil spring 80 disposed around spindle 46. Recoil spring 80 is configured to absorb any recoil forces transmitted to lower section 38 that may arise when employing payload 22.

An upper engagement surface 76 is disposed on an upper portion of both rear member 70 and front member 68 (not shown). Upper engagement surfaces 76 are configured to engage lower engagement surfaces 54 of upper section 36. In embodiments where lower engagement surfaces 54 and upper engagement surfaces 76 are spherical surfaces, upper engagement surfaces 76 may have a curvature equal to a curvature of lower engagement surfaces 54. This correspondence of curvature can facilitate sliding engagement between lower section 38 and upper section 36 when lower section 38 is in the released state. An elevation gauge 51 is provided on upper engagement surface 76 to assist an operator in adjusting the elevation of lower section 38 with respect to upper section 36.

Lower section 38 includes a plurality of azimuth adjustment slots 78 defined through upper engagement surface 76 and extending in a generally lateral direction of lower section 38. Section fasteners 42 extend through azimuth adjustment slots 78 to releasably attach lower section 38 to upper section 36. Azimuth adjustment slots 78 provide a pathway to accommodate movement of section fasteners 42 when the azimuth of lower section 38 is adjusted with respect to upper section 36. The length of azimuth adjustment slots 78 determines the extent to which the azimuth of lower section 38 may be adjusted with respect to upper section 36.

Elevation adjustment subassembly 58 is disposed within an elevation adjustment slot 82 defined in upper engagement surface 76. Elevation adjustment slot 82 is provided to accommodate movement of engagement body 64 as it moves under the urging of threaded shaft 66. Threaded shaft 66 is mounted to rear member 70 and extends through elevation adjustment slot 82. As threaded shaft 66 is rotated, engagement body 64 will move up and down within elevation adjustment slot 82. An upwardly extending protrusion 84 extends upwardly from engagement body 64 of elevation adjustment subassembly 58. Upwardly extending protrusion 84 is configured to engage azimuth adjustment slot 49 of upper section 36. Because azimuth adjustment slot 49 extends only in the lateral direction of upper section 36 and not in the longitudinal direction of upper section 36, upwardly extending protrusion 84 is inhibited by azimuth adjustment slot 49 from moving in the longitudinal direction of upper section 36 as threaded shaft 66 rotates. Accordingly, the urging of threaded shaft 66 on engagement body 64 will be transmitted to lower section 38 such that rotation of threaded shaft 66 will cause lower section 38 to move with respect to upper section 36 when lower section 38 is in the released state. In this manner, the elevation of lower section 38, and also the elevation of payload 22, may be adjusted with respect to upper section 36.

Figure 10:
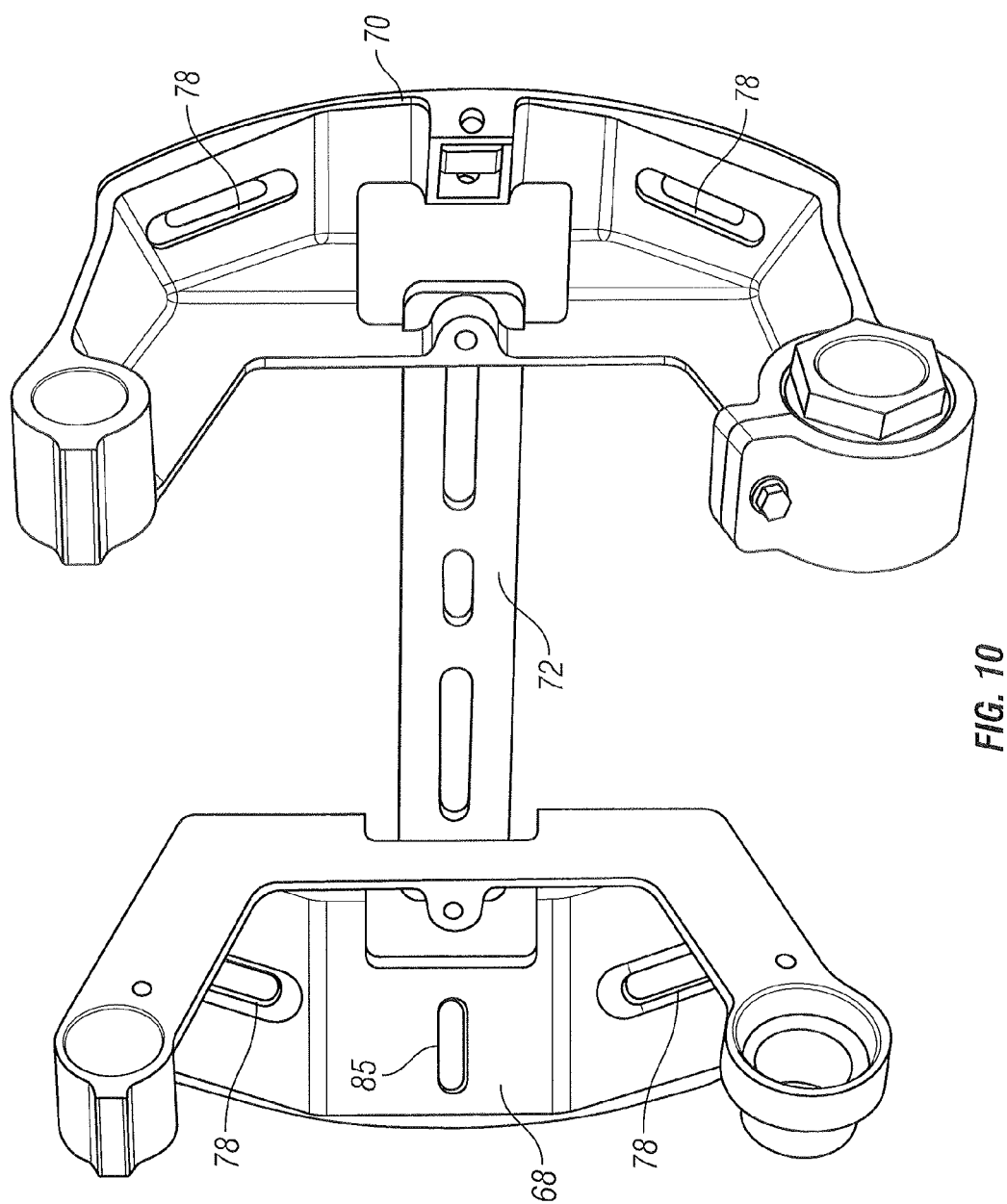
FIG. 10 is a perspective view from below the lower section of FIG. 9.
Figure 11:
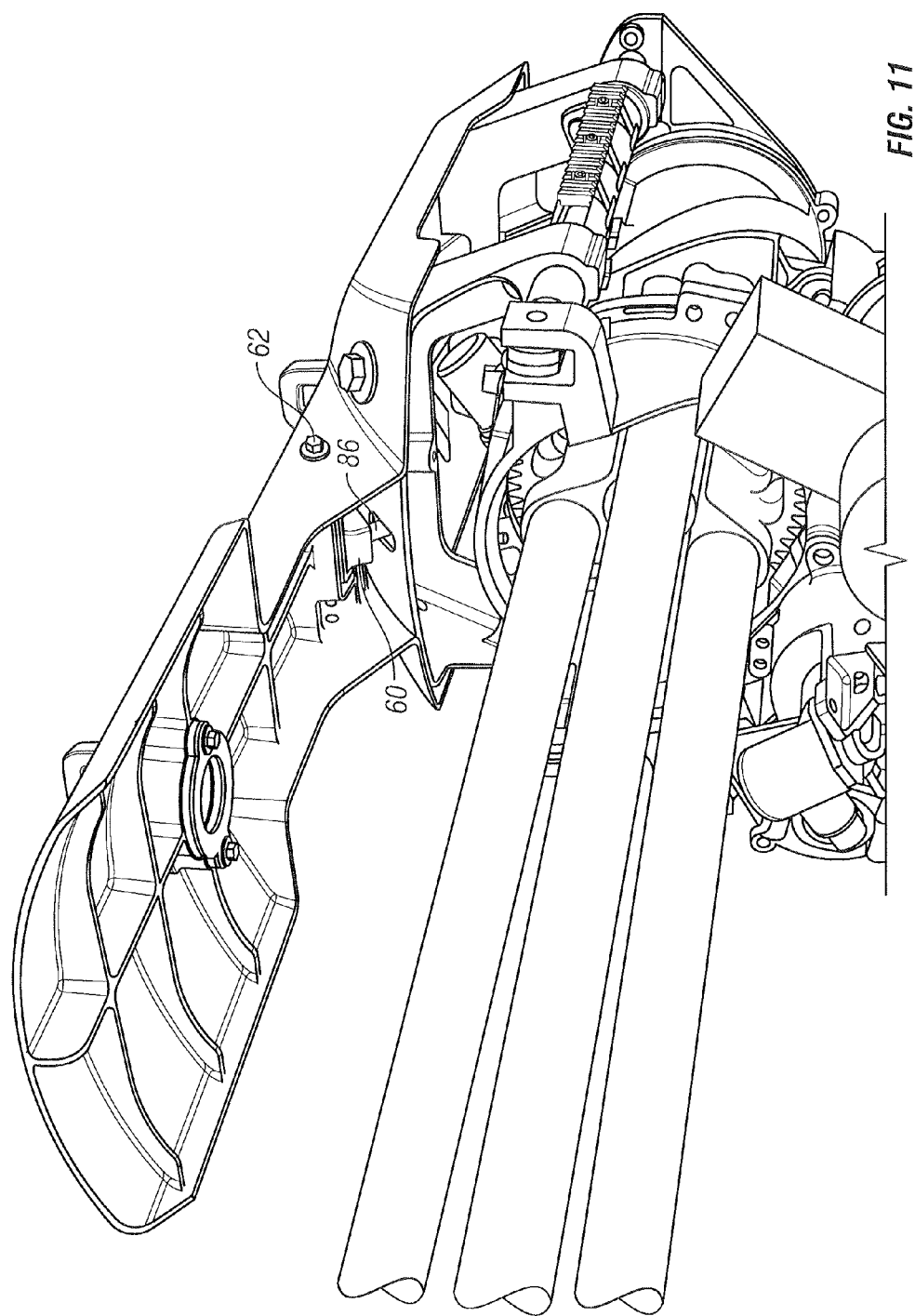
FIG. 11 is a perspective view from below the payload mount adapter assembly of FIG. 3 illustrating an embodiment of an azimuth adjusting assembly engaged with both the upper section and the lower section of the payload mount adapter assembly.

FIG. 10 is a perspective view from below lower section 38 and FIG. 11 is a perspective view from below payload mount adapter assembly 34. With continuing reference to FIG. 1-11, an elevation adjustment slot 85 extends in a longitudinal direction through the front member 68. A downwardly extending protrusion 86 extends downwardly from engagement body 60 of azimuth adjustment subassembly 56 and, as best seen in FIG. 11, extends through elevation adjustment slot 85. As the elevation of lower section 38 is adjusted with respect to upper section 36, downwardly extending protrusion 86 is free to move through elevation adjustment slot 85. However, because elevation adjustment slot 85 does not extend in the lateral direction of lower section 38, downwardly extending protrusion 86 is inhibited from moving with respect to lower section 38 when threaded shaft 62 is rotated. Thus, when threaded shaft 62 is rotated, downwardly extending protrusion 86 pushes on lower section 38 through engagement with the walls of elevation adjustment slot 85. The force of downwardly extending protrusion 86 pushing on the walls of elevation adjustment slot 85 acts on front member 68. This force will cause lower section 38 to rotate about a pin (not shown) that extends through brace 72 and thus will result in adjustment of the azimuth of lower section 38 with respect to upper section 36.

Figure 12:
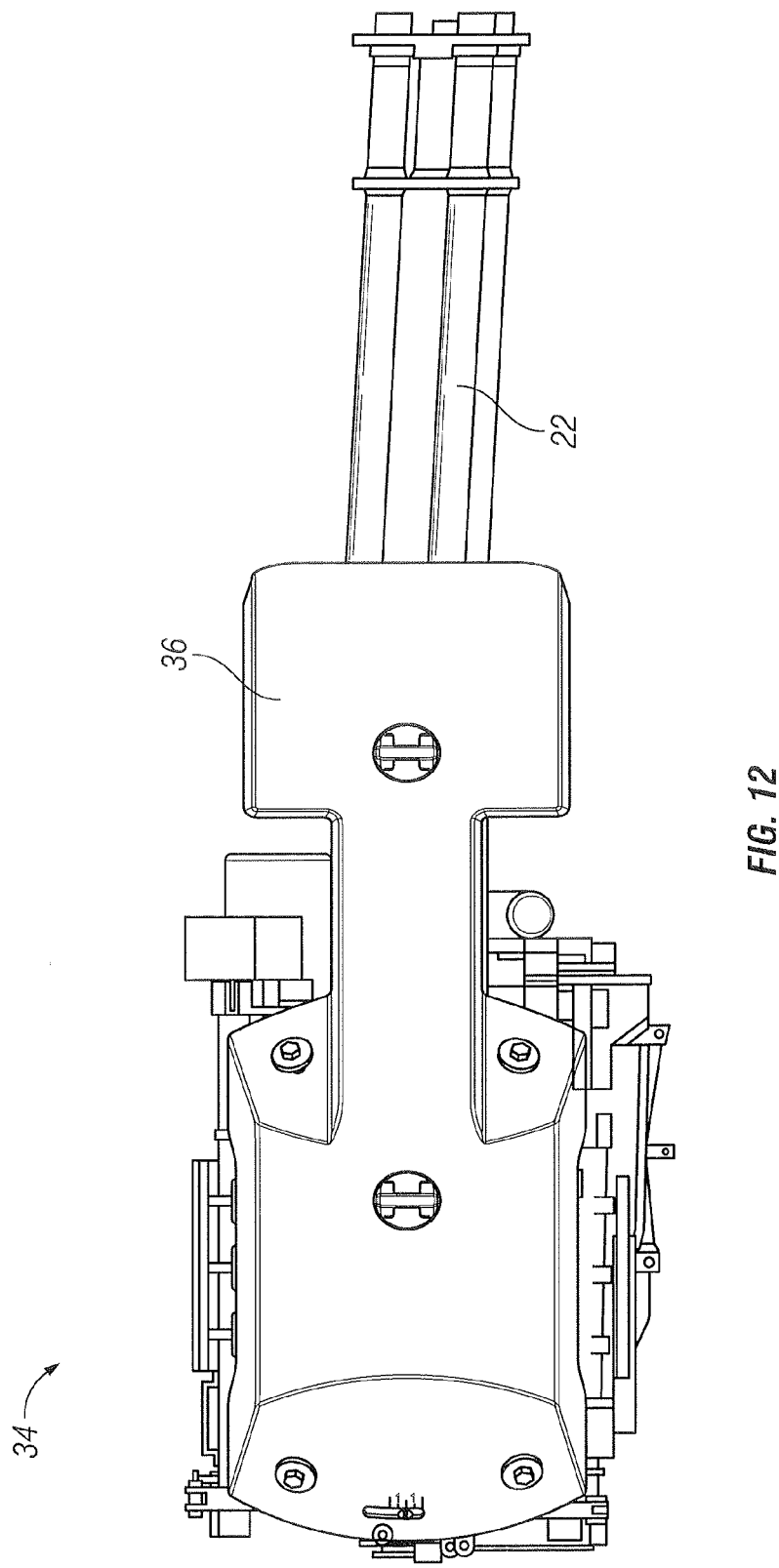
FIG. 12 is a plan view from above the payload mount adapter assembly of FIG. 3 after the azimuth of the payload has been adjusted to the right.
Figure 13:
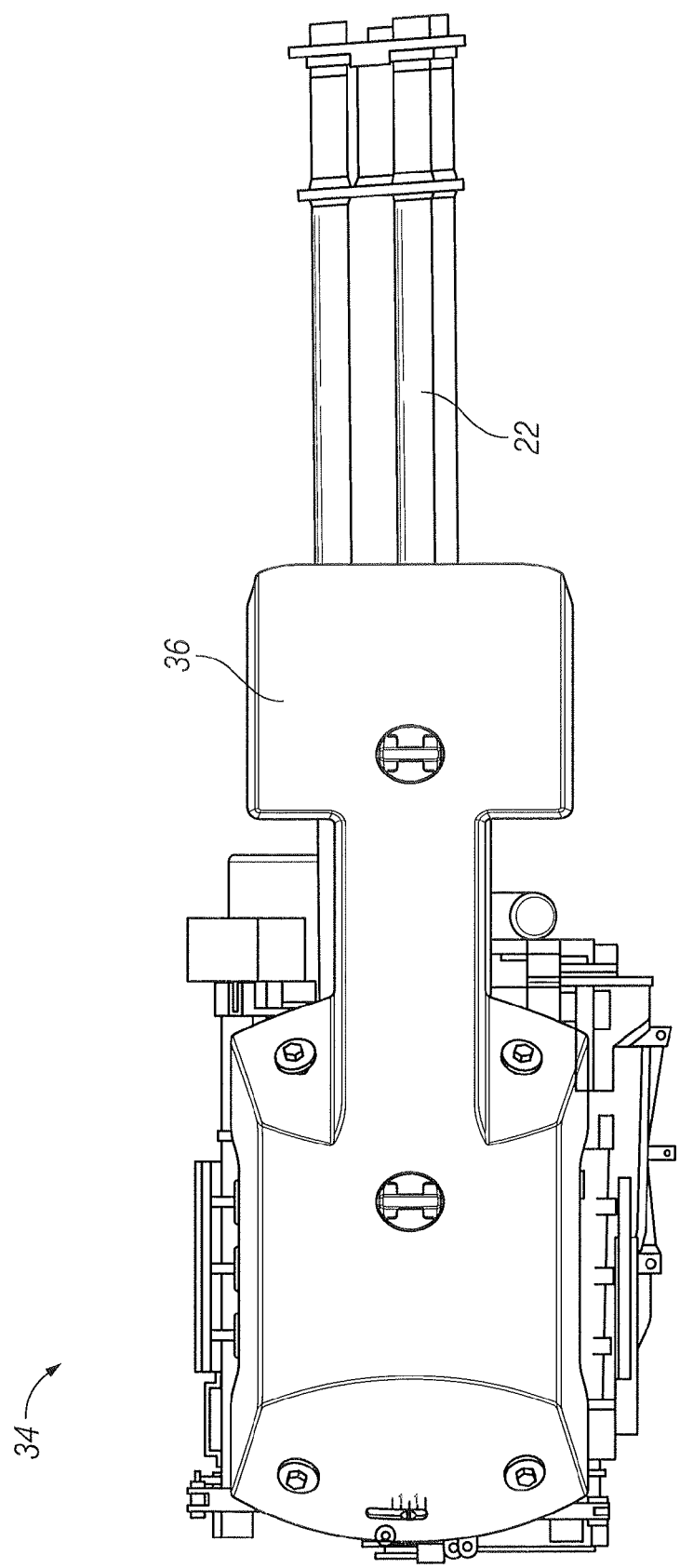
FIG. 13 is a plan view from above the payload mount adapter assembly of FIG. 3 after the azimuth of the payload has been adjusted to the left.

FIG. 12 is a plan view from above payload mount adapter assembly 34 after the azimuth of the payload has been adjusted to the right and FIG. 13 is a plan view from above payload mount adapter assembly 34 after the azimuth of the payload has been adjusted to the left. With continuing reference to FIG. 1-13, upper section 36 remains stationary as the azimuth of payload 22 is adjusted because upper section 36 is immovably attached to aircraft 20.

Figure 14:
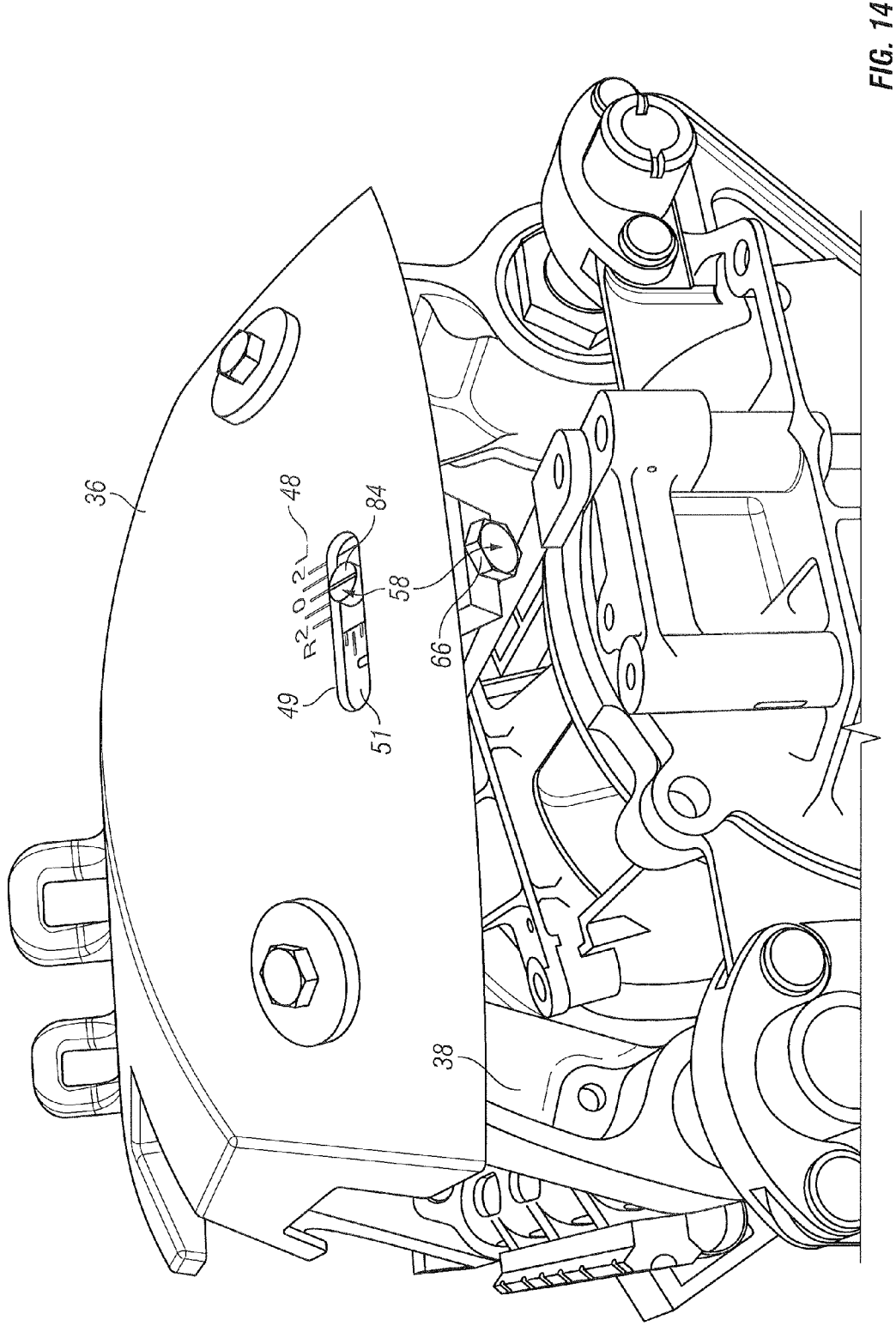
FIG. 14 is a perspective view from behind the payload mount adapter assembly of FIG. 3 illustrating an embodiment of an elevation adjusting assembly engaged with both the upper section and the lower section of the payload mount adapter assembly.

FIG. 14 is a perspective view from behind payload mount adapter assembly 34 illustrating elevation adjusting subassembly 58 engaged with both upper section 36 and lower section 38. When threaded shaft 66 is rotated, upwardly extending protrusion 84 will be held in place by the walls of azimuth adjustment slot 49 and threaded shaft 66 will urge lower section 38 to move with respect to upper section 36, thereby changing the elevation of lower section 38 and payload 22 with respect to upper section 36. Elevation gauge 51 is visible through azimuth adjustment slot 49 and may facilitate precise adjustment of the elevation of payload 22.

Figure 15:
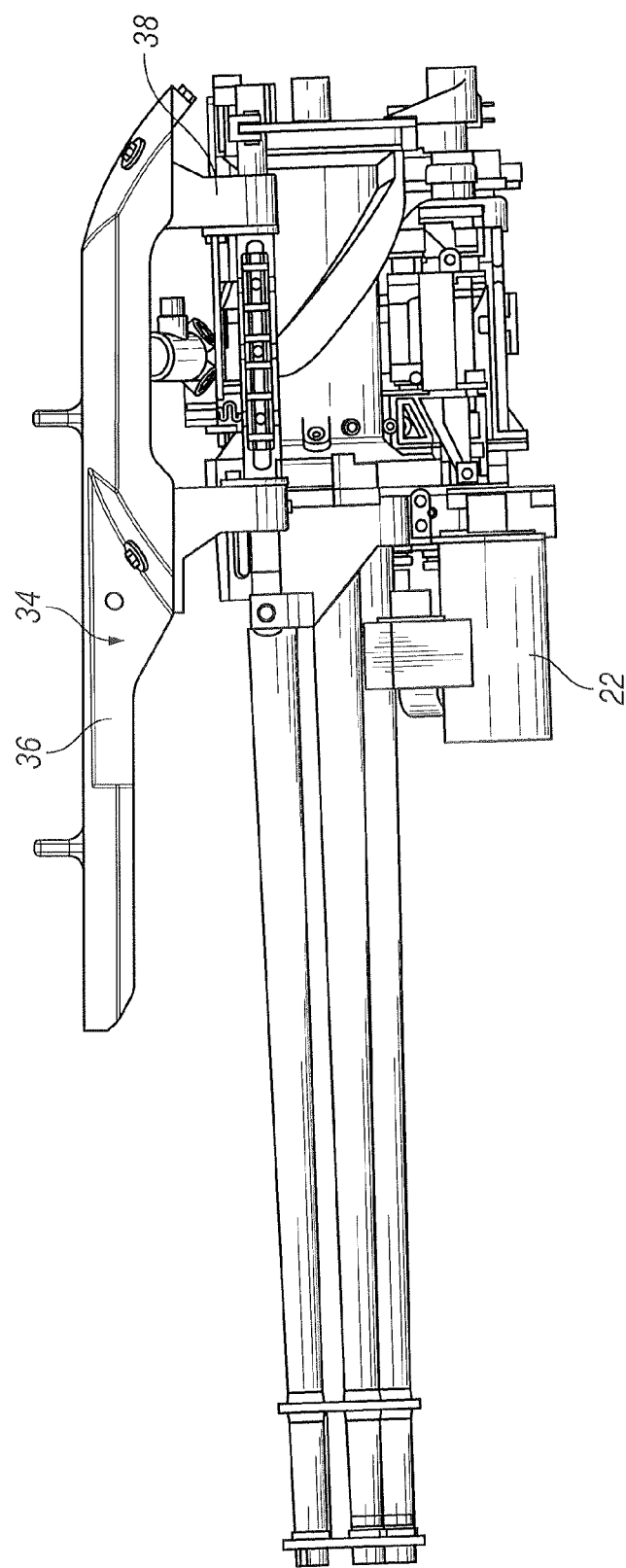
FIG. 15 is a side view illustrating the payload mount adapter assembly of FIG. 3 after the elevation of the payload has been adjusted in a downward direction.
Figure 16:
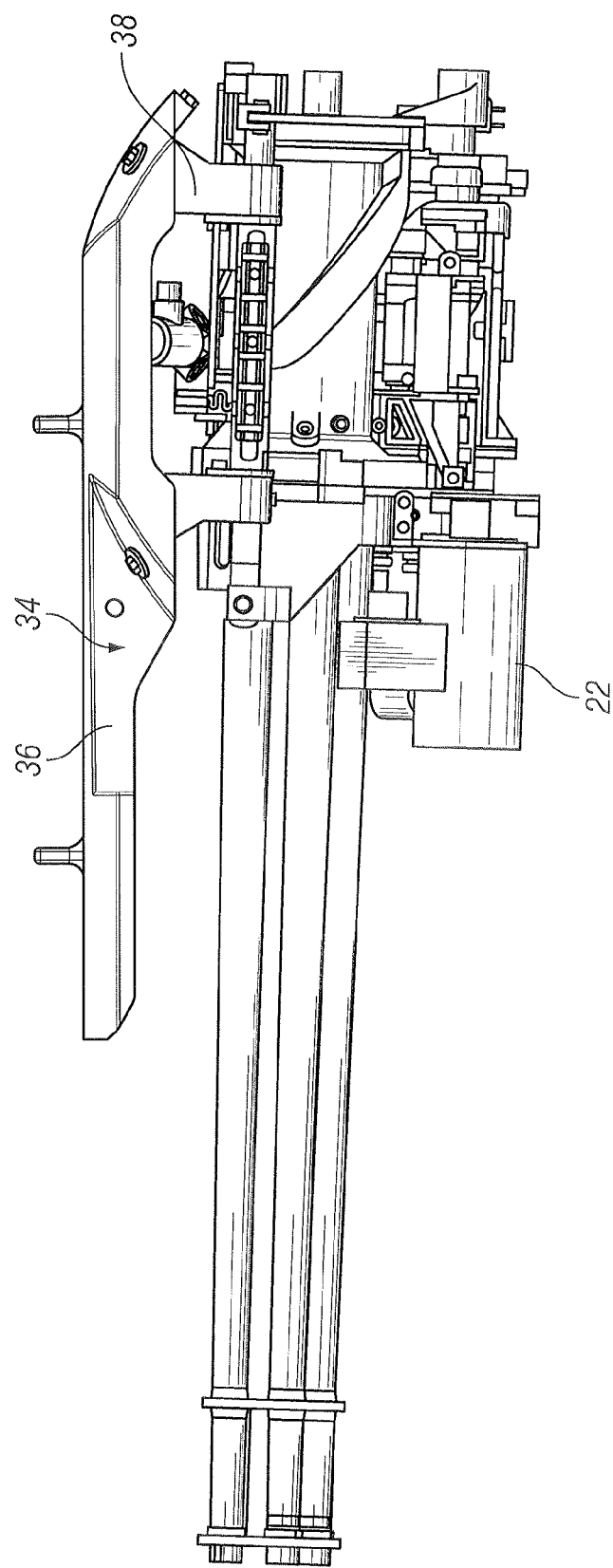
FIG. 16 is a side view illustrating the payload mount adapter assembly of FIG. 3 after the elevation of the payload has been adjusted in an upward direction.

FIG. 15 is a side view illustrating payload mount adapter assembly 34 after the elevation of payload 22 has been adjusted in a downward direction and FIG. 16 is a side view illustrating payload mount adapter assembly 34 after the elevation of payload 22 has been adjusted in an upward direction. With continuing reference to FIG. 1-16, upper section 36 remains stationary as the elevation of payload 22 is adjusted because upper section 36 is immovable in attached to aircraft 20.

Figure 17:
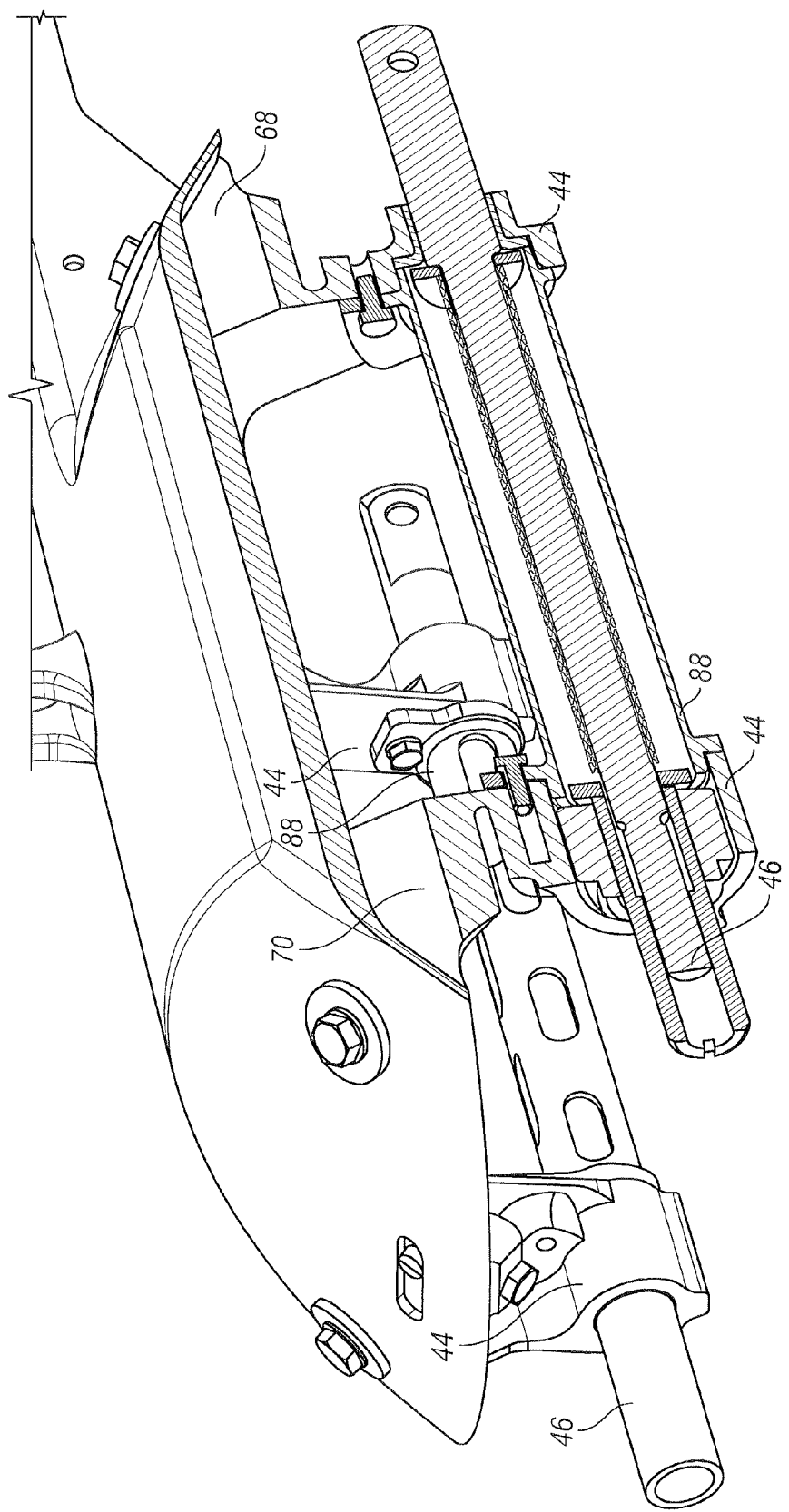
FIG. 17 is a perspective, cross sectional view illustrating an embodiment of a cover member supporting laterally disposed, downwardly extending legs to inhibit of each leg towards the other.

FIG. 17 is a perspective, cross sectional view illustrating an embodiment of a cover member 88 supporting legs 44 against movement towards one another. With continuing reference to FIG. 1-17, each cover member 88 is positioned over each spindle 46 and is disposed between a pair of legs 44. Longitudinal ends of each cover member 88 rest against each leg 44 and thereby brace each leg of each pair against movement towards one another under the loading caused by payload 22. Each cover member 88 also assists front member 68 and rear member 70 to articulate in unison during azimuth and elevation adjustment. Cover member 88 may take any suitable form. In the illustrated embodiment, cover member 88 has the general configuration of a cylinder. In other embodiments, cover member 88 may take any form effective to brace legs 44 against movement towards one another under loading conditions.

Figure 18:
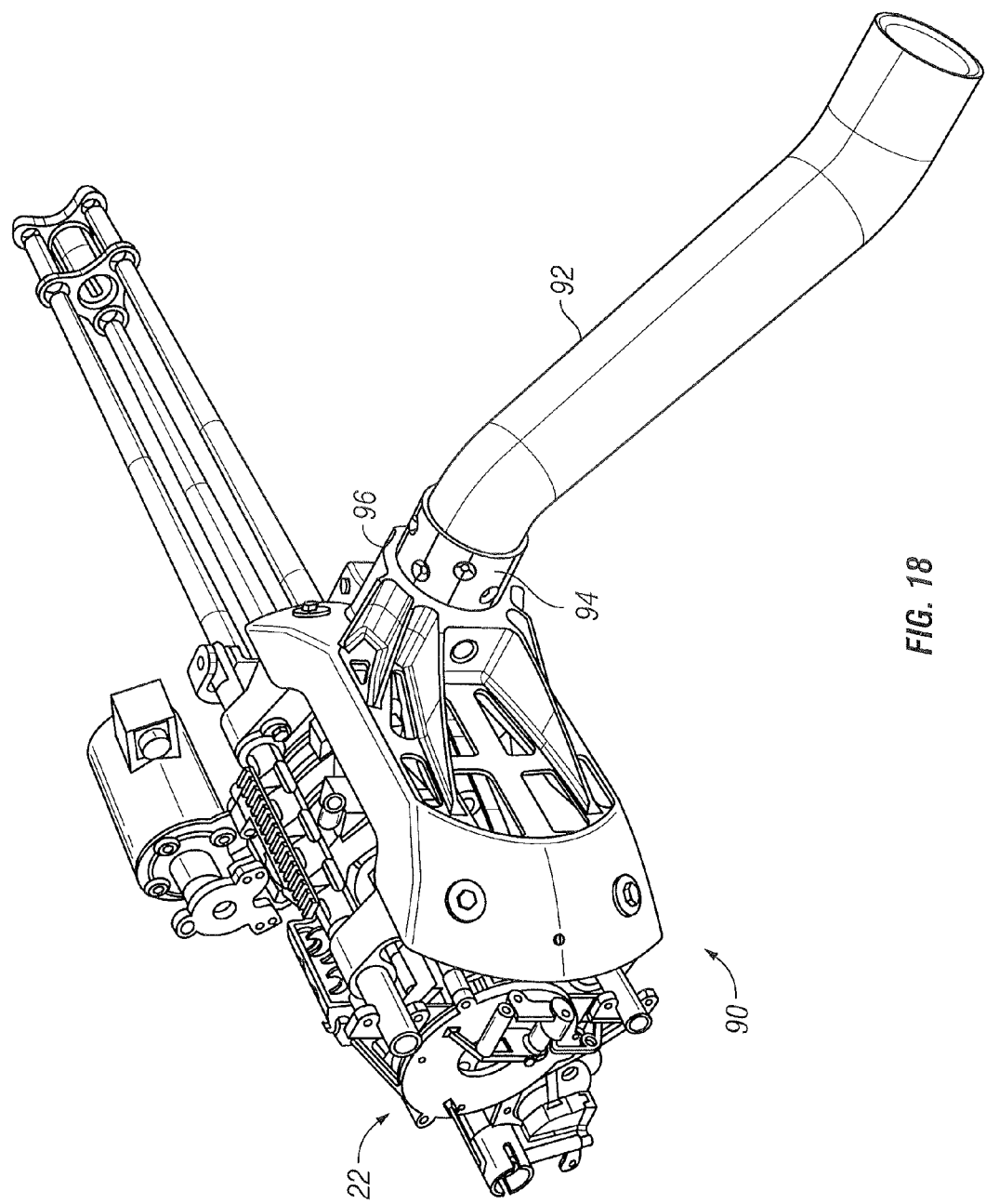
FIG. 18 is a perspective view illustrating another embodiment of the payload mount adapter assembly and a payload mounted directly to a structure of an aircraft without an intervening payload mount.

FIG. 18 is a perspective view illustrating another embodiment 90 of a payload mount adapter assembly and payload 22 mounted directly to a structure 92 of an aircraft without an intervening payload mount. Embodiment 90 is supported by structure 92 in a cantilever manner and extends outwardly from a side of aircraft 20. In other implementations, embodiment 90 may be supported in any suitable orientation with respect to aircraft 20. With continuing reference to FIGS. 1-18, structure 92 is a weapons pylon extending directly from aircraft 20. Structure 92 includes a collar 94 at an end of structure 92. Embodiment 90 of payload mount adapter assembly 34 includes a sleeve portion 96 that is configured to receive collar 94. Through engagement between collar 94 and sleeve portion 96, and through the use of fasteners (not shown) embodiment 90 is mounted directly to structure 92 without the need for payload mount 26. While a sleeve and collar arrangement has been illustrated in FIG. 18, it should be understood that in other implementations of embodiment 90, any other configuration that permits direct engagement between embodiment 90 and structure 92 may be utilized.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A payload mount adapter assembly for use with a an aircraft, the payload mount adapter assembly comprising:
   an upper section configured for mounting to the aircraft; and
   a lower section configured to receive a payload, the lower section being releasably engaged with the upper section such that the lower section is substantially unadjustable with respect to the upper section when the lower section is in a fixed state and the lower section is substantially adjustable with respect to the upper section when the lower section is in a released state.

2. The payload mount adapter assembly of claim 1, wherein the upper section and the lower section are configured to permit adjustment of an azimuth and an elevation of the payload when the lower section is in the released state.

3. The payload mount adapter assembly of claim 1, wherein the lower section is configured to slide with respect to the upper section when in the released state.

4. The payload mount adapter assembly of claim 1, further comprising a threaded fastener joining the upper section to the lower section, the lower section being in the fixed state when the threaded fastener is tightened and the lower section being in the released state when the threaded fastener is loosened.

5. The payload mount adapter assembly of claim 1, wherein the upper section and the lower section comprise aluminum.

6. A payload mount adapter assembly for use with a payload mount mounted to an aircraft, the payload mount adapter assembly comprising:
   an upper section configured for mounting to the payload mount and comprising a first engaging surface; and
   a lower section configured to receive a payload and comprising a second engaging surface, the lower section being releasably fixed to the upper section such that when the lower section is in a fixed state, the second engaging surface engages the first engaging surface to substantially inhibit adjustment of the lower section with respect to the upper section, and when the lower section is in a released state, the second engaging surface at least partially disengages from the first engaging surface to permit adjustment of the lower section with respect to the upper section.

7. The payload mount adapter assembly of claim 6, wherein the upper section and the lower section are configured to permit adjustment of an azimuth and an elevation of the payload when the lower section is in the released state.

8. The payload mount adapter assembly of claim 6, further comprising a threaded fastener joining the upper section to the lower section, the lower section being in the fixed state when the threaded fastener is tightened and the lower section being in the released state when the threaded fastener is loosened.

9. The payload mount adapter assembly of claim 8, wherein the first engaging surface and the second engaging surface are configured for sliding engagement, wherein the second engaging surface is permitted to slide with respect to the first engaging surface when the threaded fastener is loosened, and wherein the first engaging surface and the second engaging surface are compressed against one another and are frictionally inhibited from moving with respect to one another when the threaded fastener is tightened.

10. The payload mount adapter assembly of claim 8, wherein a first slot is defined through a first surface of the upper section and a second slot is defined through a second surface of the lower section, wherein the threaded fastener extends through the first slot and the second slot, and wherein the first slot is substantially transverse to the second slot.

11. The payload mount adapter assembly of claim 10, wherein one of the first slot and the second slot is oriented in a longitudinal direction of the payload mount adapter assembly to permit adjustment of an elevation of the payload and wherein another of the first slot and the second slot is oriented in a lateral direction of the payload mount adapter assembly to permit adjustment of an azimuth of the payload.

12. The payload mount adapter assembly of claim 10, wherein the first slot is defined in the first engaging surface and the second slot is defined in the second engaging surface.

13. The payload mount adapter assembly of claim 6, further comprising an elevation adjustment subassembly comprising a first threaded shaft in threaded engagement with a first engagement body, the first threaded shaft engaging one of the upper section and the lower section, and the first engagement body engaging another of the upper section and the lower section, wherein rotation of the first threaded shaft results in relative movement between the upper section and the lower section, and wherein the first threaded shaft is oriented to adjust an elevation of the payload when the first threaded shaft rotates.

14. The payload mount adapter assembly of claim 6, further comprising an azimuth adjustment subassembly comprising a second threaded shaft in threaded engagement with a second engagement body, the second threaded shaft engaging one of the upper section and the lower section, and the second engagement body engaging another of the upper section and the lower section, wherein rotation of the second threaded shaft results in relative movement between the upper section and the lower section, and wherein the second threaded shaft is oriented to adjust an azimuth of the payload when the second threaded shaft rotates.

15. The payload mount adapter assembly of claim 6, wherein the first engaging surface is disposed on a lower portion of the upper section and wherein the second engaging surface is disposed on an upper portion of the lower section.

16. The payload mount adapter assembly of claim 6, wherein the upper section comprises a plurality of the first engaging surfaces and wherein the lower section comprises a plurality of the second engaging surfaces.

17. The payload mount adapter assembly of claim 6, wherein the lower section includes a first pair of spaced apart legs extending downwardly from a first lateral side of the lower section and a second pair of spaced apart legs extending downwardly from a second lateral side of the lower section, wherein the payload mount adapter assembly further comprises a first spindle extending between the first pair of spaced apart legs, a second spindle extending between the second pair of spaced apart legs, a first cover member disposed between the first pair of spaced apart legs and covering a portion of the first spindle, and a second cover member disposed between the second pair of spaced apart legs and covering a portion of the second spindle, wherein the first spindle and the second spindle are configured to engage and support the payload, wherein the first cover member is configured to inhibit movement of the first pair of spaced apart legs towards one another under loading by the payload, and wherein the second cover member is configured to inhibit movement of the second pair of spaced apart legs towards one another under loading by the payload.

18. A payload mount adapter assembly for use with a payload mount mounted to an aircraft, the payload mount adapter assembly comprising:
an upper section configured for mounting to the payload mount and comprising a first spherical surface; and
a lower section configured to receive a payload and comprising a second spherical surface, the second spherical surface engaging the first spherical surface, the lower section being releasably fixed to the upper section such that when the lower section is in a fixed state, the second spherical surface is pressed against the first spherical surface by a compressive force that substantially inhibits adjustment of the lower section with respect to the upper section, and when the lower section is in a released state, the compressive force is reduced to permit the second spherical surface to slide with respect to the first spherical surface and thereby permit adjustment of the lower section with respect to the upper section.

19. The payload mount adapter assembly of claim 18, wherein a first curvature of the first spherical surface is substantially equal to a second curvature of the second spherical surface.

20. The payload mount adapter assembly of claim 18, wherein the upper section and the lower section are configured to permit adjustment of an azimuth and an elevation of the payload when the lower section is in the released state.

* * * * *